United States Patent
Hultine et al.

[11] Patent Number: 6,116,192
[45] Date of Patent: Sep. 12, 2000

[54] PIEZOELECTRIC SHOCKING DEVICE

[76] Inventors: J. Dustin Hultine, P.O. Box 1428, Wilsonville, Oreg. 97070; Terry Clark, 31460 SW. Isle Way La., West Linn, Oreg. 97068

[21] Appl. No.: 09/119,364

[22] Filed: Jul. 20, 1998

[51] Int. Cl.[7] .......................... A01K 15/02; A01K 15/04; A62B 35/00
[52] U.S. Cl. ............................ 119/719; 119/859; 119/908
[58] Field of Search .................... 119/719, 720, 119/721, 859, 908; 607/58, 1

[56] References Cited

U.S. PATENT DOCUMENTS

| | | | |
|---|---|---|---|
| 2,023,950 | 12/1935 | Carter | 119/792 |
| 3,687,112 | 8/1972 | Henderson . | |
| 3,874,339 | 4/1975 | Coulbourn | 119/859 |
| 3,936,678 | 2/1976 | Mohr . | |
| 3,963,411 | 6/1976 | Challet . | |
| 3,963,966 | 6/1976 | Mohr . | |
| 3,984,738 | 10/1976 | Mohr . | |
| 4,097,025 | 6/1978 | Dettmann et al. . | |
| 4,167,036 | 9/1979 | Kenney . | |
| 4,488,511 | 12/1984 | Grassano | 119/798 |
| 4,539,937 | 9/1985 | Workman | 119/859 |
| 4,934,925 | 6/1990 | Berloncourt . | |
| 5,161,485 | 11/1992 | McDade . | |
| 5,207,178 | 5/1993 | McDade et al. . | |
| 5,494,002 | 2/1996 | Greene . | |
| 5,601,054 | 2/1997 | So . | |
| 5,666,908 | 9/1997 | So . | |
| 5,668,439 | 9/1997 | Snelling et al. . | |
| 5,722,352 | 3/1998 | Leatherman . | |
| 5,871,518 | 2/1999 | Blum | 607/58 |
| 5,957,093 | 9/1999 | Balaun . | |

FOREIGN PATENT DOCUMENTS 3300486 12/1984 Germany ................................ 119/859

*Primary Examiner*—Peter M. Poon
*Assistant Examiner*—Judith A. Nelson
*Attorney, Agent, or Firm*—Pitts & Brittian, P.C.

[57] ABSTRACT

A piezoelectric shocking device for training an animal to alter or avoid particular behaviors such as pulling on a leash, pressing against a fence, or in the instance of a horse, cribbing or wind sucking. The device includes an inner housing for receiving internal components, and an outer housing for receiving the inner housing. The inner housing is nested within the outer housing in a sliding fashion. The internal working components of the device include a piezoelectric ceramic crystal which, when struck with sufficient force, generates an electrical pulse. In order to capture this electrical pulse, electrical contacts are positioned on either end of the crystal and in direct contact therewith such that a force exerted on either electrical contact is transferred directly to the crystal. A hammer is provided for striking the first electrical contact with the force required to generate an electrical pulse. An energy storage spring is provided for storing potential energy which is released to propel the hammer toward the crystal. A return spring is provided for returning the hammer to an initial position away from the crystal. As the inner housing and outer housings are pulled away from each other, the energy storage spring is compressed, storing potential energy. When the potential energy has reached a level sufficient to disengage the hammer collar from the crystal receptacle shoulder, the hammer is thrust toward the first electrical contact. When the hammer strikes the first electrical contact, an electrical pulse is generated by the crystal and is transmitted through the first and second electrical leads and the hammer is returned to its original position by the return spring.

17 Claims, 11 Drawing Sheets

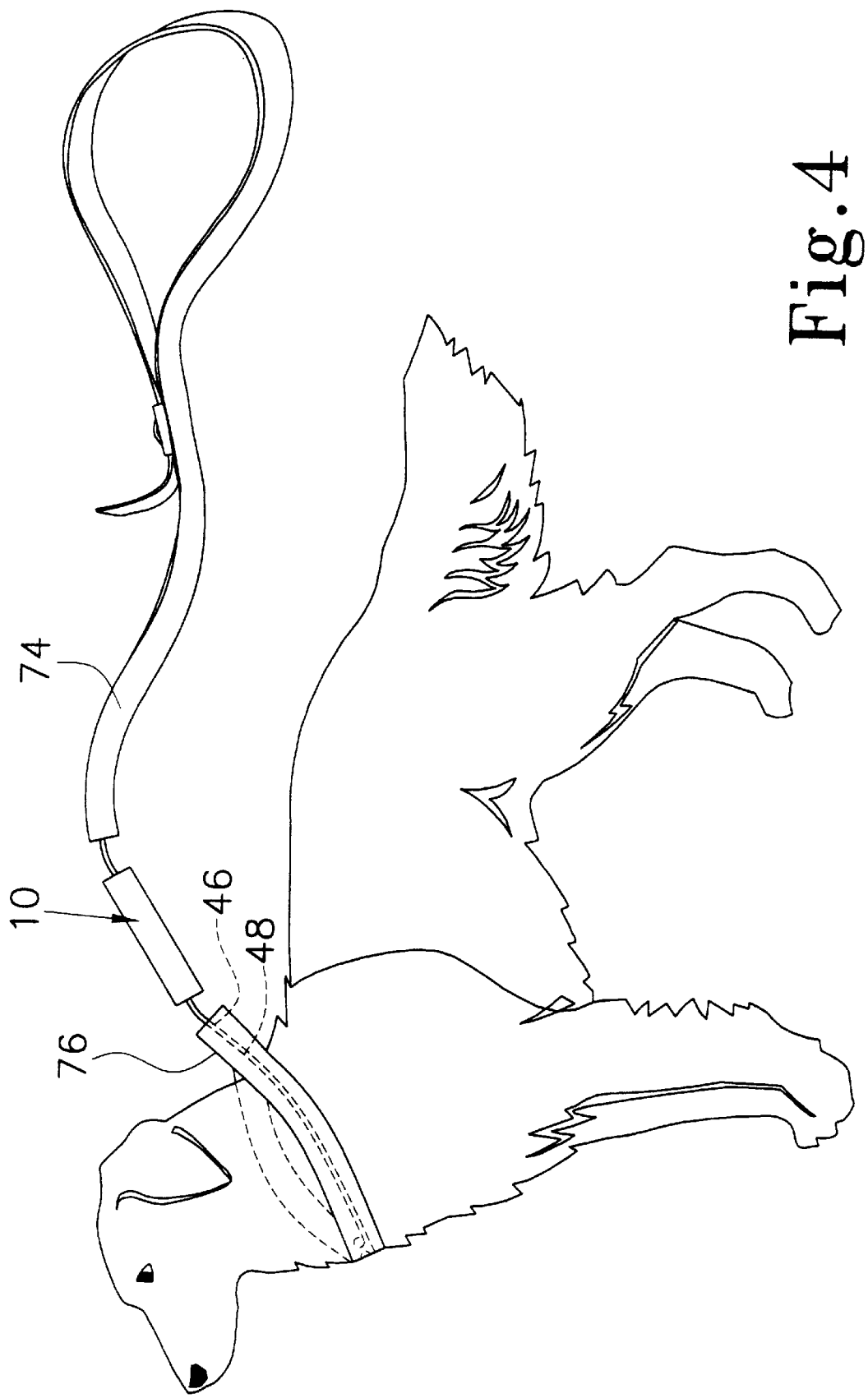

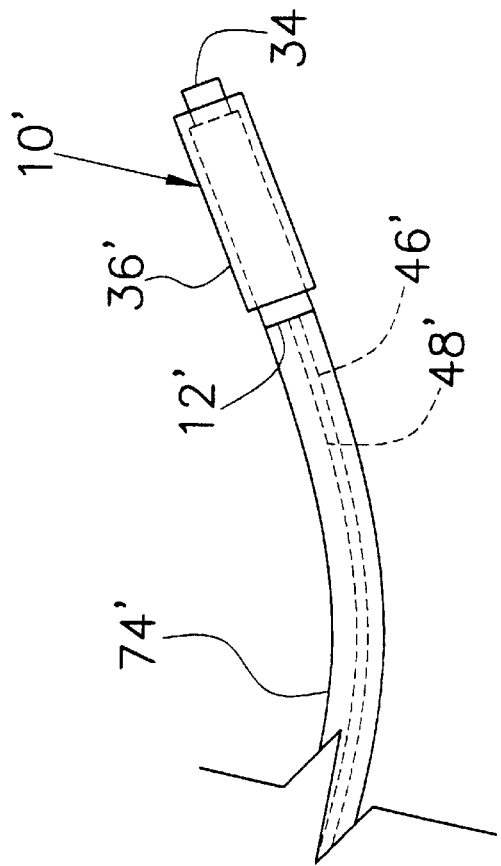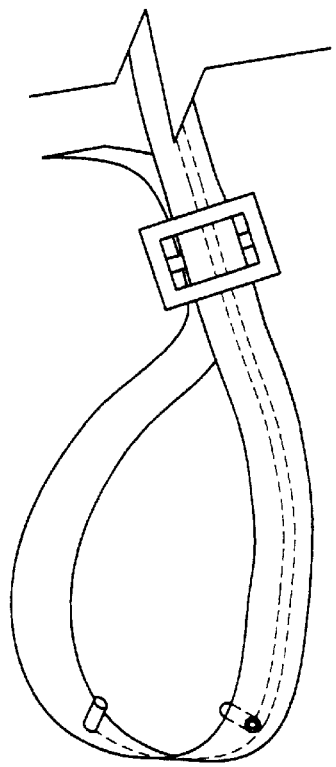
Fig. 5

PIEZOELECTRIC SHOCKING DEVICE

TECHNICAL FIELD

This invention relates to the field of animal behavior control devices. More specifically, the present invention relates to a piezoelectric device adapted to be used to modify or prevent particular animal behaviors.

BACKGROUND ART

In the field of animal behavior control and modification, it is well known that electrical stimulus is useful in deterring or modifying certain behaviors. Several devices have been produced to perform such functions. Typical of the art are those devices disclosed in the following U.S. Patents:

| U.S. Pat. No. | Inventor(s) | Issue Date |
|---|---|---|
| 3,687,112 | G. A. Henderson | Aug. 29, 1972 |
| 4,167,036 | F. M. Kenney | Sept. 4, 1979 |
| 5,161,485 | R. McDade | Nov. 10, 1992 |
| 5,207,178 | R. McDade, et al. | May 4, 1993 |
| 5,494,002 | T. R. Greene | Feb. 27, 1996 |
| 5,601,054 | H. Y. So | Feb. 11, 1997 |
| 5,666,908 | H. Y. So | Sept. 16, 1997 |
| 5,722,352 | N. E. Leatherman | Mar. 3, 1998 |

Of these, most are disclosed as being useful in training animals, and specifically dogs. Each uses a DC battery in order to supply voltage to the particular training device, usually to a collar worn by the dog. Activation of the devices is accomplished in several methods. Greene ('s002) discloses the use of tension in the leash applied by the dog being used to depress an activation switch to close an electric circuit, again supplied using DC power, to subsequently apply shock to the dog. Leatherman ('s352) and Henderson ('s112) both disclose DC powered devices for applying electric shock to the throat of a horse to prevent cribbing and/or wind sucking.

Although many devices are in existence for providing electric shock therapy to an animal for behavior modification purposes, there are no such devices in the prior art which use the force exerted by the animal to generate the electrical energy used to shock the animal.

Piezoelectric devices are known in the art for several purposes. Typical of the art incorporating piezoelectric devices are those devices disclosed in the following U.S. Patents:

| U.S. Pat. No. | Inventor(s) | Issue Date |
|---|---|---|
| 3,936,678 | W. Mohr | Feb. 3, 1976 |
| 3,963,411 | J. Challet | June 15, 1976 |
| 3,963,966 | W. Mohr | June 15, 1976 |
| 3,984,738 | W. Mohr | Oct. 5, 1976 |
| 4,097,025 | C. R. Dettmann, et al. | June 27, 1978 |
| 4,934,925 | D. A. Berlincourt | June 19, 1990 |
| 5,668,439 | C. R. Snelling, et al. | Sept. 16, 1997 |

Of these devices, the 's439 device disclosed by Snelling, et al., is a high voltage power supply fabricated in a web having a piezoelectric exterior layer. A voltage is generated on the surface in response to being deformed around an arrangement of rollers. An arrangement of commutation and neutralization brushes controls the level of the voltage and transfers the voltage generated by the device. Due to the complexity of such arrangements, both in the fabrication of the web and in the roller and brush assembly, such a device is not designed for portability. Nor does such a device anticipate the use of piezoelectricity for the behavioral training of pets.

Dettmann, et al. ('s025) disclose the use of piezoelectricity for surveillance purposes in association with a perimeter fence. The 's025 device uses vibrations in the fence to generate an electrical response from a piezoelectric element. The 's025 device does not teach the use of a piezoelectric device for generating an electric shock, but in a more complex application, uses such a device for delivering an electrical signal through an electronic network to a monitoring site. Accordingly, Dettmann, et al., do not teach the use of a piezoelectric device for modifying or deterring particular animal behaviors.

The remainder of the afore-mentioned prior art devices disclose various means for igniting a fire using a piezoelectric ignitor. Specifically, the devices disclose the use of a piezoelectric device to create a spark in order to ignite a gas-fueled fire. These devices do not teach the use of such devices to produce an electric charge. Further, these devices do not anticipate the use of piezoelectric devices in the realm of animal behavior modification and deterrence.

Therefore, it is an object of this invention to provide a means for modifying and/or deterring particular animal behaviors, including but not limited to mammals and marine animals, through the use of a piezoelectric device.

Another object of the present invention is to provide such a device whereby an electric charge is delivered to the animal upon the occurrence of undesirable behavior, the electric charge being generated by a force applied to the device, and independent of any other electrical source.

A further object of the present invention is to provide such a device which may be incorporated into a leash such that tension on the leash actuates the device to deliver the electric charge to the animal.

Still another object of the present invention is to provide such a device which is disposed in a collar worn by an animal and to which may be attached a conventional leash.

Yet another object of the present invention is to provide such a device which may be operated by a trainer in order to selectively deliver an electric shock to the animal.

Still another object of the present invention is to provide such a device which may be incorporated in a horse collar to prevent harmful behaviors such as cribbing and wind sucking.

A further object of the present invention is to provide such a device which may be incorporated in a length of a perimeter fence to provide a means whereby electric shock may be administered to an animal attempting to cross the fence, while also rendering the fence safe for birds which may land thereon.

Yet another object of the present invention is to provide a device for delivering a series of electrical shocks to an animal in order to train the behavior of the animal.

DISCLOSURE OF THE INVENTION

Other objects and advantages will be accomplished by the present invention which is provided for training animals to alter or avoid particular behaviors. Specifically, the present invention is a piezoelectric shocking device provided for deterring animals from pulling on a leash, pressing against a fence, or performing other selected non-desirable actions. Force applied to the device causes internal movement of the working parts of the present invention in order to generate an electrical pulse, thereby rendering the present invention as not requiring the use of batteries.

The device of the present invention includes an inner housing for receiving internal components, and an outer housing for receiving the inner housing. The inner housing is nested within the outer housing in a sliding fashion. To accomplish movement of the inner housing within the outer housing, a securement device is carried by each of the outer housing end wall and the inner housing distal end wall. The internal working components of the device includes a piezoelectric ceramic crystal which, when struck with sufficient force, generates an electrical pulse. In order to capture this electrical pulse, electrical contacts are positioned on either end of the crystal and in direct contact therewith such that a force exerted on either electrical contact is transferred directly to the crystal. A hammer is provided for striking the first electrical contact with the force required to generate an electrical pulse. An energy storage spring is provided for storing potential energy which is released to propel the hammer toward the crystal. A return spring is provided for returning the hammer to an initial position away from the crystal.

A crystal receptacle is carried within the inner housing for securement of the crystal and the electrical contacts. The return spring is also received within the receptacle. A shoulder is defined by the receptacle on which the hammer rests prior to activation of the device. At the proximal end within the inner housing, a return spring retainer is defined to receive the proximal end of the return spring and maintain its position within the inner housing.

As the inner housing and outer housings are pulled away from each other, the energy storage spring is compressed, storing potential energy. When the potential energy has been reached a level sufficient to disengage the hammer collar from the crystal receptacle shoulder, the hammer is thrust toward the first electrical contact. When the hammer strikes the first electrical contact, an electrical pulse is generated by the crystal and is transmitted through the first and second electrical leads, with one serving as a negative lead and the other as a positive lead. Immediately after striking the first electrical contact, the hammer is returned to its original position as a result of potential energy stored in, and then released from, the return spring.

The device may be utilized in several specific applications. For example, the device may be incorporated into a dog leash. In this embodiment, the electrical leads terminate in the collar such that any electrical pulse generated by the device is transmitted to the neck of the dog. This embodiment is especially useful in training a dog while walking in order to prevent the dog from attempting to run from the trainer. In a further embodiment, the device is incorporated in the handle of a pet leash such that the trainer may apply an electrical shock to the pet as desired. In yet another embodiment, the device of the present invention is used in association with a horse collar intended to prevent cribbing and/or wind sucking. Still yet, a further embodiment of the present invention is incorporated in an electric fence. In this embodiment, the device is actuated when sufficient force is applied to the fence wire, while rendering the fence wire safe to the touch and to birds landing thereon.

BRIEF DESCRIPTION OF THE DRAWINGS

The above mentioned features of the invention will become more clearly understood from the following detailed description of the invention read together with the drawings in which:

FIG. 4 illustrates the present invention used in association with a pet leash;

FIG. 5 illustrates the present invention used in association with the handle portion of a pet leash in order for a trainer to manually apply a stimulus to the pet;

BEST MODE FOR CARRYING OUT THE INVENTION

A piezoelectric shocking device incorporating various features of the present invention is illustrated generally at 10 in the figures. The piezoelectric shocking device, or device 10, is designed for use in training animals to induce a particular behavior or to avoid particular behavioral patterns. Moreover, in the preferred embodiment the device 10 is designed to apply an electrical shock to an animal using force generated by the animal in order to eliminate the need for electrical power sources. The present invention is provided for deterring animals from pulling on a leash 74, pressing against a fence wire 80, or performing other selected non-desirable actions. Force applied to the device causes internal movement of the working parts of the present invention in order to generate an electrical pulse, thereby rendering the present invention as not requiring the use of batteries.

Figure 1:
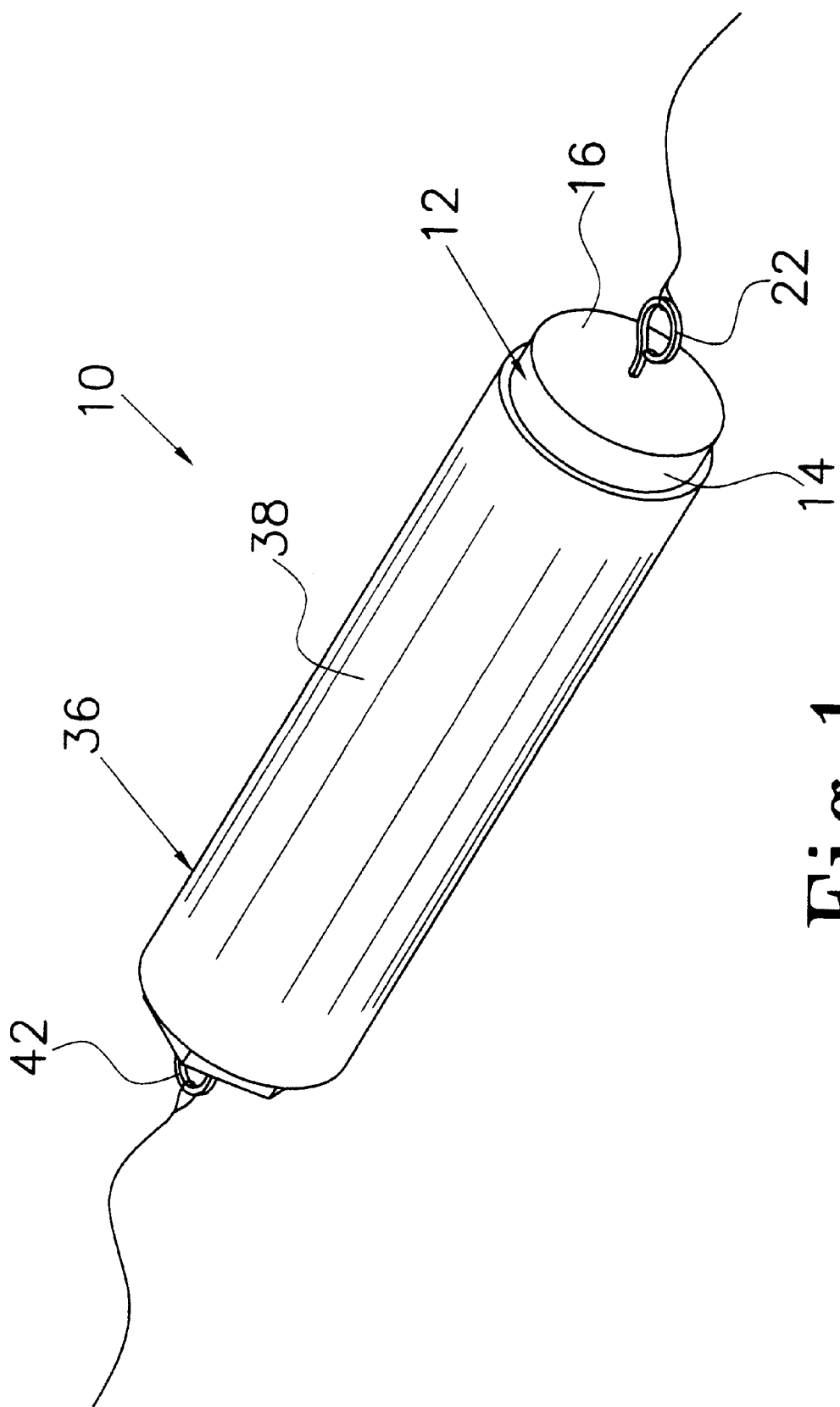
FIG. 1 is a perspective view of the piezoelectric shocking device constructed in accordance with several features of the present invention.

The device 10 of the present invention may be used in various environments to accomplish a desired behavior in an animal. As illustrated in FIGS. 1 and 3, the device 10 includes an inner housing 12 for receiving internal components, and an outer housing 36 for receiving the inner housing 12. The inner housing 12 is nested within the outer housing 36 in a sliding fashion. To this extent, the outer housing 36 defines a cylindrical side wall 38 and an end wall 40 at a proximal end thereof. The inner housing 12 defines a cylindrical side wall 14 dimensioned to be closely and slidably received within the outer housing cylindrical side wall 38. The inner housing 12 further defines a proximal end wall 16 and a distal end wall 20 to cover the respective proximal and distal ends of the side wall 14. To accomplish movement of the inner housing 12 within the outer housing 36, a securement device 42,22 is carried by each of the outer housing end wall 40 and the inner housing distal end wall 20, respectively. As will described below, each securement device 42,22 of the preferred embodiment is electrically conductive in order to serve as an electrical contact to conduct an electrical pulse generated by the device 10.

Figure 2:
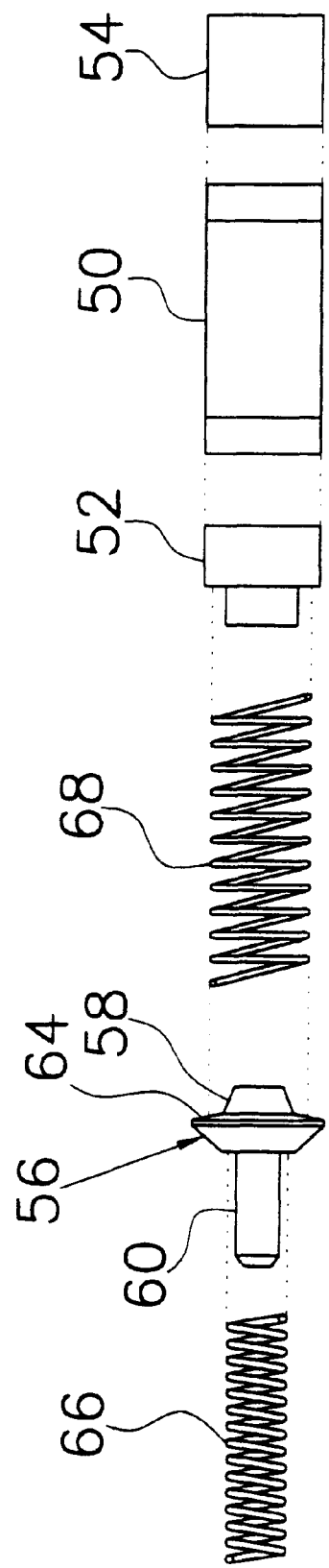
FIG. 2 illustrates an exploded side elevation view of the internal working components of the invention of FIG. 1.

FIG. 2 illustrates in an exploded fashion the internal working components of the device 10. Central to the operation of the device 10 is a piezoelectric ceramic crystal 50 which, when struck with sufficient force, generates an electrical pulse. It will be understood by those skilled in the art that one or piezoelectric ceramic crystals 50 may be provided in series in order to vary the properties of the generated electric charge. In order to capture this electrical pulse, first and second electrical contacts 52,54 are positioned on either end of the crystal 50 and in direct contact therewith such that a force exerted on the first electrical contact 52 is transferred directly to the crystal 50. A hammer 56 is provided for striking the first electrical contact 52 with the force required to generate an electrical pulse. An energy storage spring 66 is provided for storing potential energy which is released as will be described to propel the hammer 56 toward the first electrical contact 52. A return spring 68 is provided for returning the hammer 56 to an initial position away from the first electrical contact 52. To this extent, the hammer 56 defines a first extended portion 58 configured to be received within the return spring 68, and a second extended portion 60 configured to be received within the energy storage spring 66.

Figure 3A:
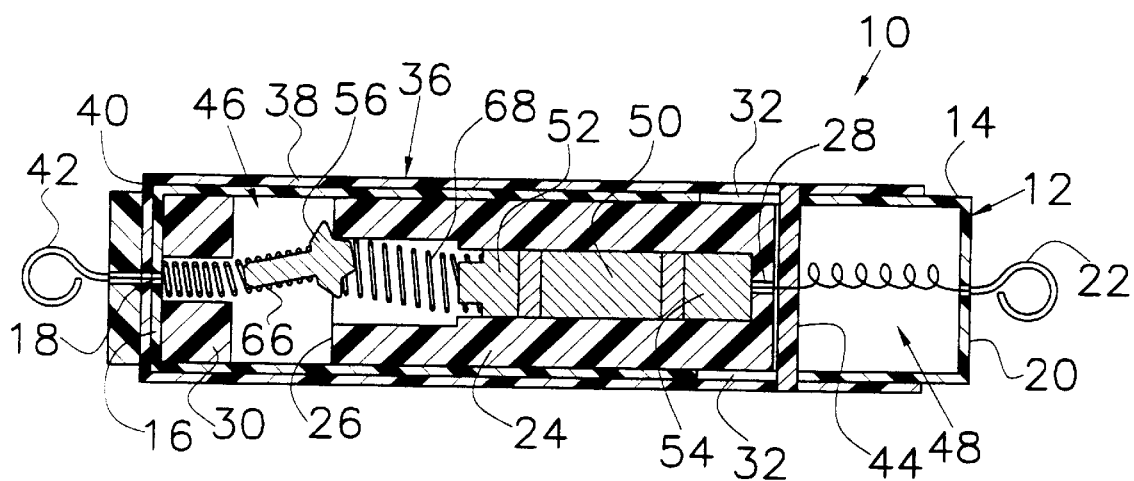
FIGS. 3a, 3b, and 3c are side elevation views, in section, of the piezoelectric shocking device of FIG. 1 shown prior to actuation, during actuation just prior to release of the hammer, and at the point of impact of the hammer with the piezoelectric ceramic crystal, respectively.
Figure 3B:
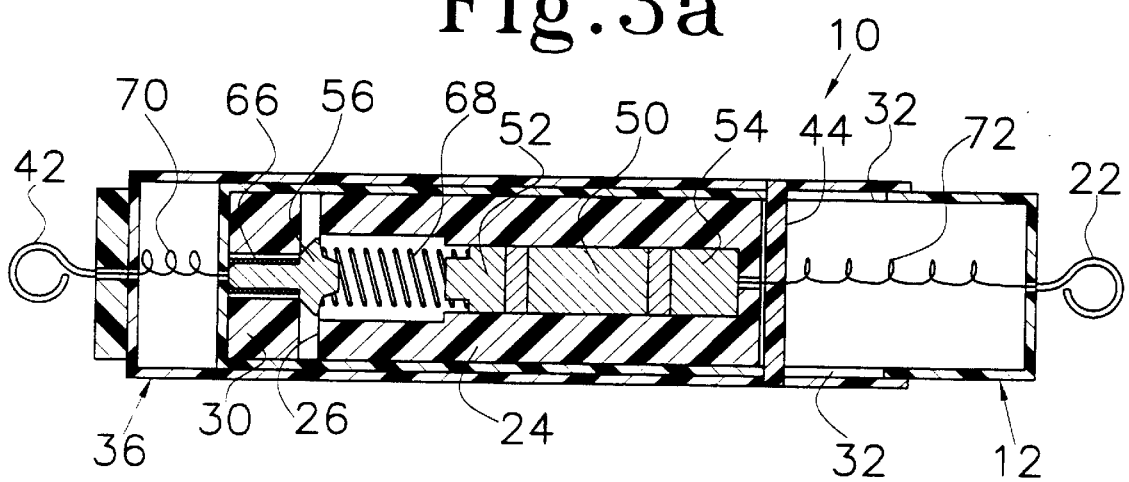
Figure 3C:
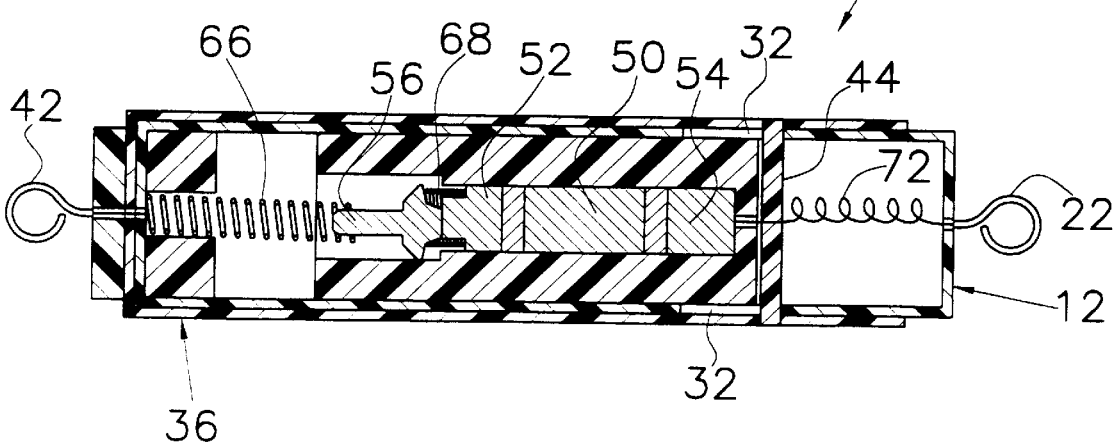

Referring now to FIGS. 3a–3c, the various positions of the inner and outer housings 12,36 and the internal components of the device 10 are illustrated. FIG. 3a illustrates the device 10 at rest, prior the application of a force to create an electrical pulse. A crystal receptacle 24 is carried within the inner housing 12 for securement of the crystal 50 and the first and second electrical contacts 52,54. At least a portion of the return spring 68 is also received within the crystal receptacle 24. A shoulder 26 is defined by the crystal receptacle 24 on which the hammer 56 rests prior to activation of the device 10. To this extent, the hammer 56 further defines a collar portion 62, between the first and second extended portions 58,60, having a distal surface 64 for engaging the shoulder 26. The distal surface 64 is sloped away from the second extended portion 60 in order to assist in the disengagement of the hammer 56 from the shoulder 26. At the proximal end within the inner housing 12, a return spring retainer 30 is defined to receive the proximal end of the return spring 68 and maintain its position within the inner housing 12.

In order to transmit an electrical pulse from the crystal 50, a first coiled lead 70 is connected between the energy storage spring 66 and the outer housing securement device 42. To this extent, an opening 18 is defined in the inner housing proximal end wall 16 for passage of the first coiled lead 70. Each of the energy storage spring 66, the hammer 56, and the return spring 68 are fabricated from electrically conductive materials in the preferred embodiment. Therefore, the first electrical contact 52, the return spring 68, the hammer 56, the energy storage spring 66, the first coiled lead 70, and the outer housing securement device 42 cooperate in concert to define a first electrical lead 46 from the proximal end of the crystal 50.

A second coiled lead 72 is electrically connected between the second electrical contact 54 and the inner housing securement device 22. To this extent, an opening 28 is defined by the crystal receptacle 24 for passage of the second coiled lead 72. The second electrical contact 54, the second coiled lead 72, and the inner housing securement device 22 thus serve as a second electrical lead 48 from the distal end of the crystal 50.

As illustrated in FIG. 3b, as the inner housing 12 and outer housing 36 are pulled away from each other, the energy storage spring 66 is compressed, storing potential energy. When the potential energy reaches a level sufficient to disengage the hammer collar 62 from the crystal receptacle shoulder 26, the hammer 56 is thrust toward the first electrical contact 52 as illustrated in FIG. 3c. When the hammer 56 strikes the first electrical contact 52, an electrical pulse is generated by the crystal 50 and is transmitted through the first and second electrical leads 46,48, with one serving as a negative lead and the other as a positive lead. Immediately after contacting the first electrical contact 52, the hammer 56 is returned to its original position as illustrated in FIG. 3a as a result of potential energy stored in, and then released from, the return spring 68.

In order to limit the travel of the inner housing 12 within the outer housing 36, a pin 44 is carried by and fixed to the outer housing cylindrical wall 38 and is received through slotted openings 32 defined by the inner housing cylindrical wall 14. The slotted openings 32 are configured to prevent rotation of the inner housing 12 within the outer housing 36, and to limit travel of the inner housing 12 within the outer housing 36.

Having described the general operation of the device 10, several specific utilizations of the device are depicted in the remaining figures. FIG. 4 illustrates the use of the device 10 in association with a pet leash 74. In this embodiment, the first and second electrical leads 46,48 terminate in the collar 76 such that any electrical pulse generated by the device 10 is transmitted to the neck of the pet. In order to accomplish this utilization, it will be seen that both the first and second electrical leads 46,48 must be directed toward the collar 76. This embodiment is especially useful in training a dog while walking in order to prevent the dog from attempting to run from the trainer. With the leash 74 being held firmly by the trainer, when the dog applies sufficient force to the leash 74 in order to pull the inner and outer housings 12,36 away, an electrical charge is generated and applied to the neck of the dog. It will be understood by those skilled in the art that the device 10 as illustrated in FIG. 4 may alternatively be disposed in the collar 76 of the leash 74 with equal effectiveness.

In the embodiment illustrated in FIG. 5, the device 10' is incorporated in the handle of a pet leash 74, such that the trainer may apply an electrical shock to the pet as desired. A push button 34 disposed at the end of the device 10', for example, is provided for moving the inner housing 12' within the outer housing 36' to generate an electrical pulse. Thus, when a pet is being trained or otherwise controlled, any behavior the trainer deems as undesirable may be punished with an electrical pulse.

Figure 6:
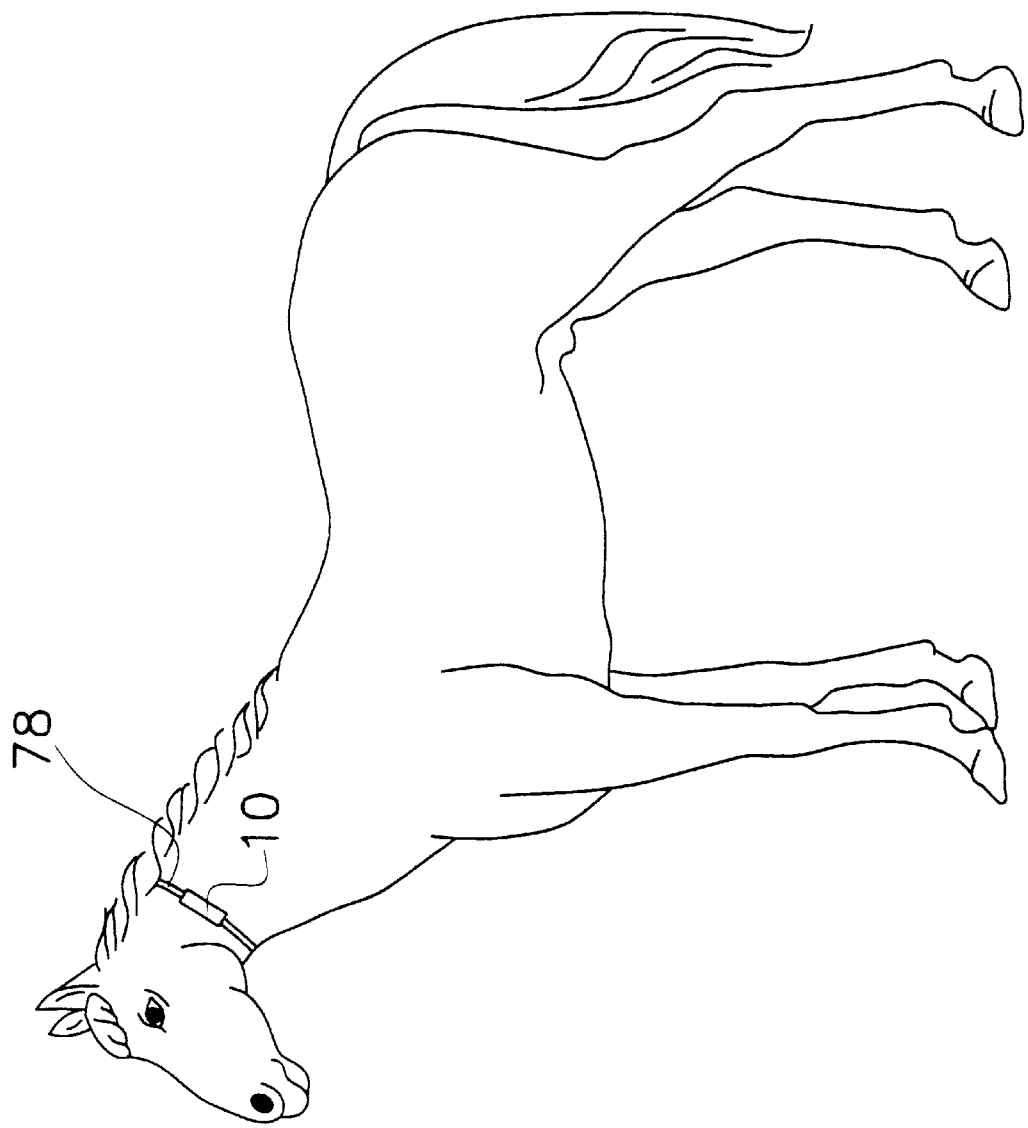
FIG. 6 illustrates the present invention used as an anti-cribbing device in association with a collar worn by a horse.

FIG. 6 illustrates the use of the device 10 of the present invention in association with a horse collar 78 intended to prevent cribbing and/or wind sucking. Each of these behaviors leads to adverse physical conditions. During either of these activities, the throat of the horse is expanded. Accordingly, the device 10 of the present invention is incorporated into a horse collar 78 such that when the throat is expanded a sufficient degree, the device is actuated and an electrical charge is applied to the throat of the horse, thus causing the behavior to cease. After a sufficient number of shocks being applied to the horse, the behavior may be modified.

Figure 7:
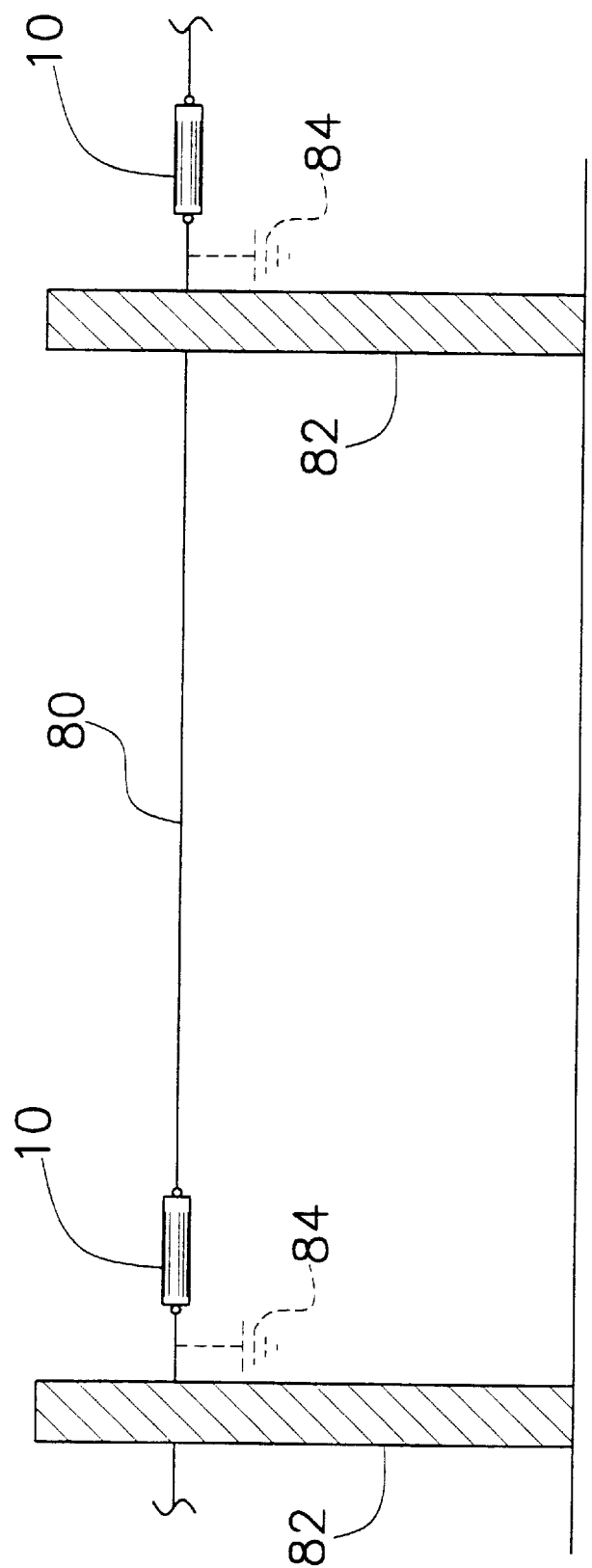
FIG. 7 illustrates the present invention used in association with an animal retention fence in order to selectively apply a voltage to an animal applying pressure to the fence.

In a further disposition of the present invention as illustrated in FIG. 7, the device 10 is incorporated in an electric fence wire 80. In conventional electric fences, a charge is applied to an electric wire 80 disposed about the perimeter of an enclosed area. The charge is then applied to a subject touching the wire 80. In some circumstances wherein the area is relatively large, either the voltage applied to the wire must be large or a plurality of voltage sources must be incorporated. However, in the present invention, the device 10 is electrically connected to a conductor wire 80 at one end and to a ground 84 at the other. In the illustrated embodiment, the fence post 82 is metal and therefore serves as a ground. However, in the event the fence post 82 is fabricated from a non-conducting material such as wood or plastic, the device 10 is grounded as illustrated in phantom at 84. In this environment, the device 10 is actuated only when sufficient force is applied to the fence wire 80. Accordingly, the fence wire 80 incorporating the present invention provides several benefits over those fences in the prior art. Specifically, accidental touching of the wire 80 will not create a shock. Nor will the resting of a bird on the fence wire 80, which, in conventional electric fences, can be fatal to the bird. It will be understood by those skilled in the art that although the embodiment illustrated in FIG. 7 is depicted in use with a span of a fence wire 80, the device 10 may similarly be used to prevent animals from entering or crossing a doorway, window, or other opening or passageway.

Figure 8:
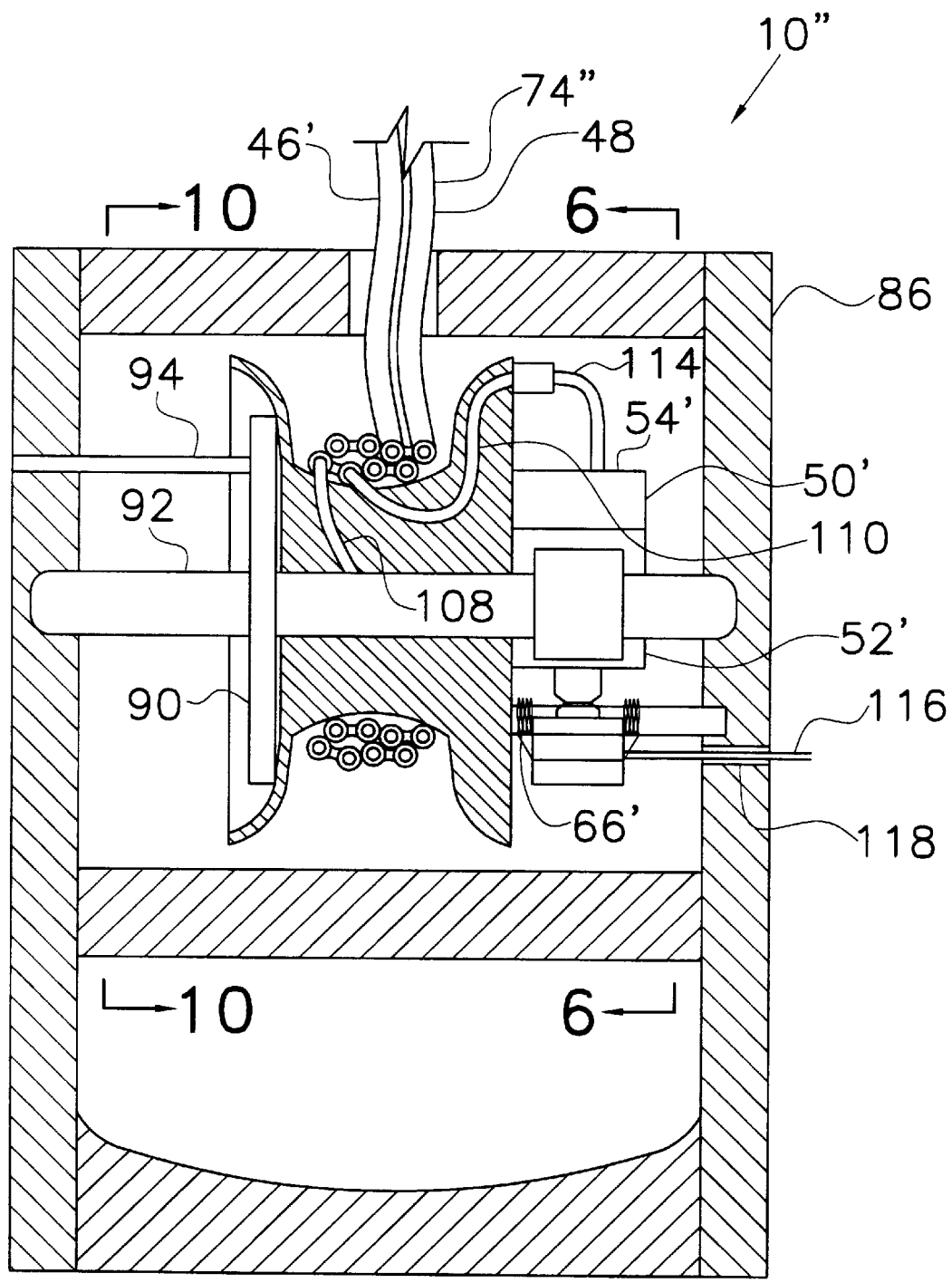
FIG. 8 illustrates a side elevation view of an alternate embodiment of the present invention wherein a repetitive charge may be generated and delivered to a pet.
Figure 9A:
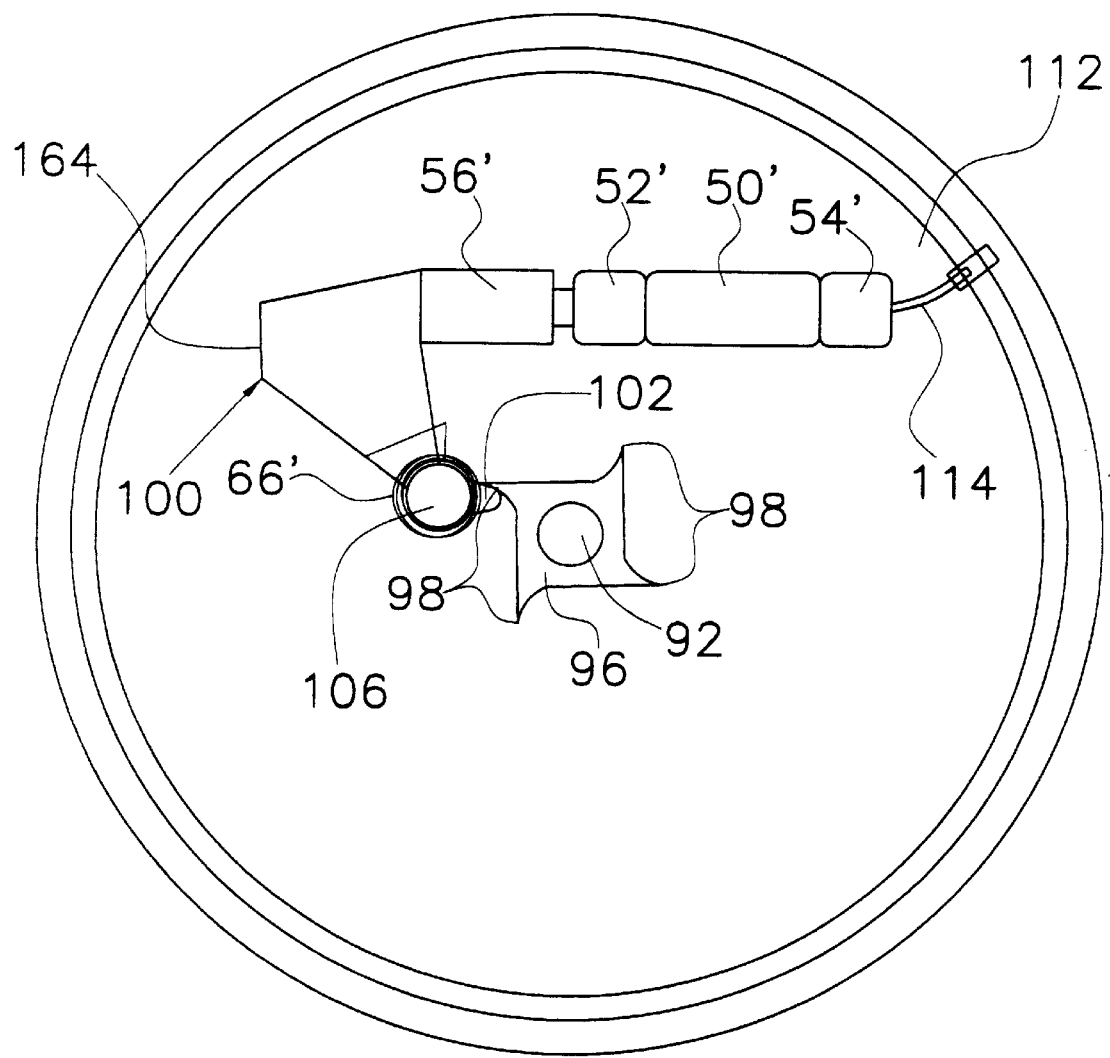
FIG. 9A illustrates a plan view, in section, of the alternate embodiment illustrated in FIG. 8, showing a hammer in a cocked position.
Figure 9B:
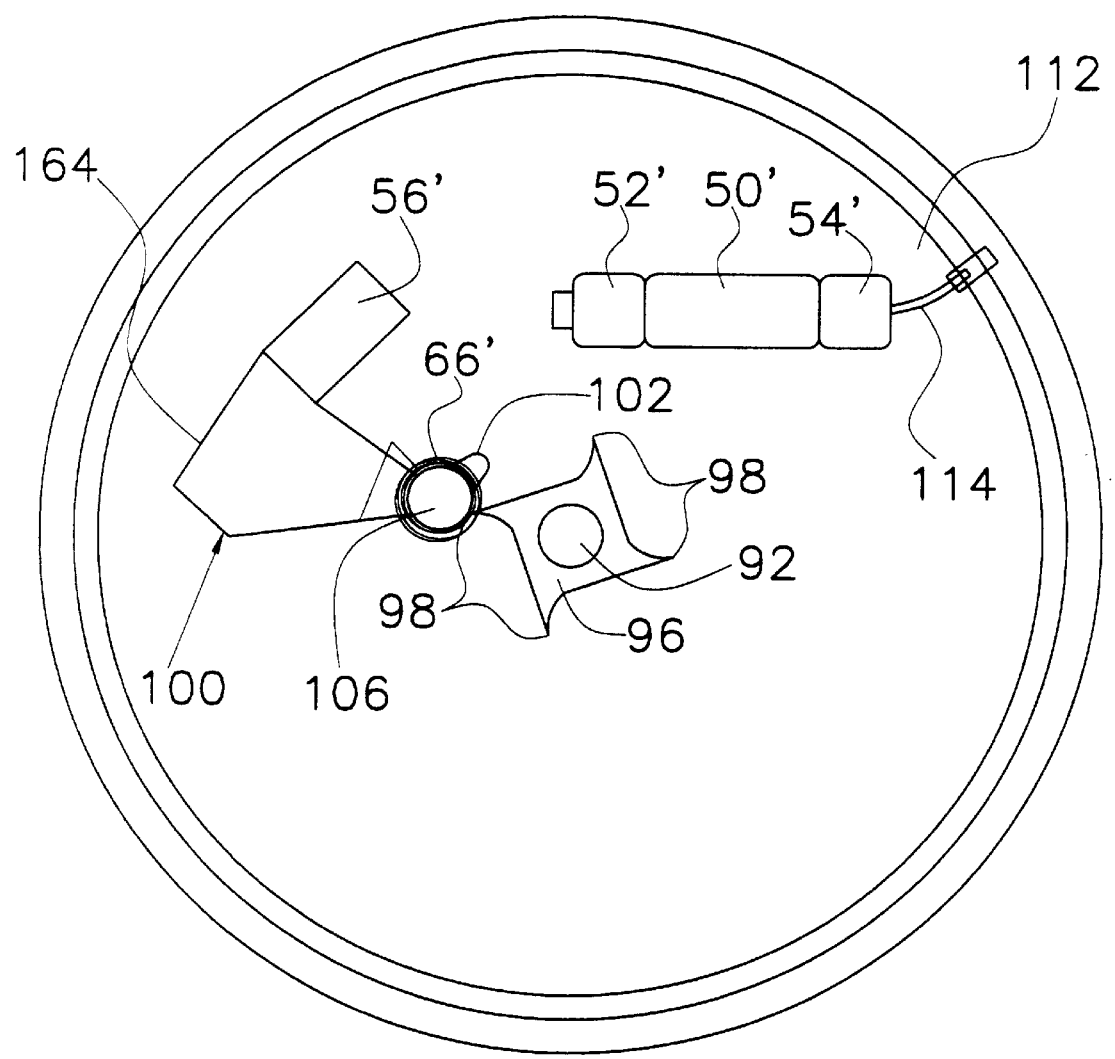
FIG. 9B illustrates a plan view, in section, of the alternate embodiment illustrated in FIG. 8, showing a hammer in a released position.
Figure 10:
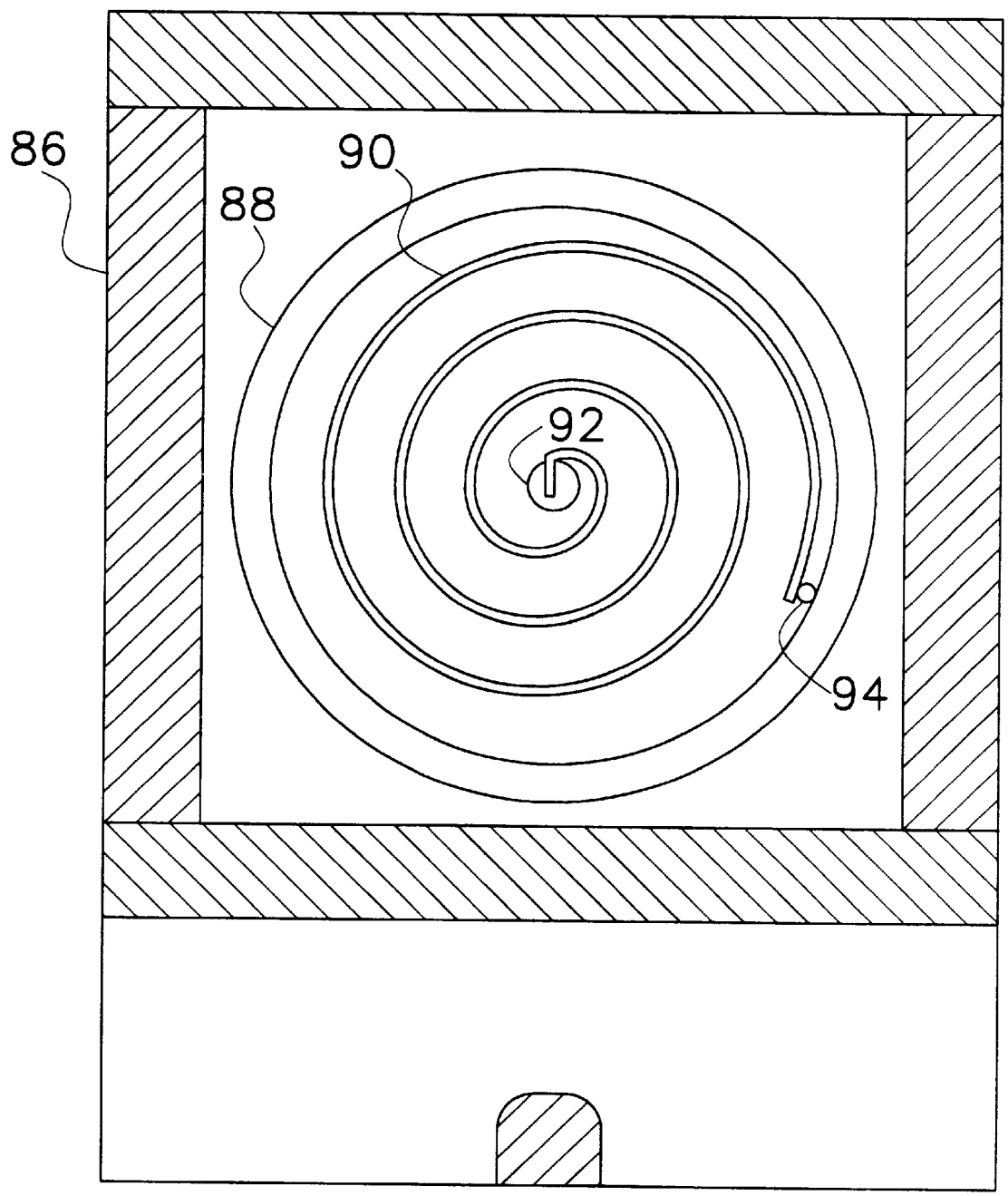
FIG. 10 is a plan view, in section, of the alternate embodiment illustrated in FIG. 8 showing a biasing device.

In a further embodiment of the present invention, as illustrated in FIGS. 8–10, the device 10" is disposed within a housing 86 associated with a retractable leash 74". Referring primarily to FIG. 8, in this embodiment, the device 10" is designed to deliver a repeated electrical charge as the leash 74" is being withdrawn from the housing 86. In order to accomplish this, the leash 74" is secured within the housing 86 to a spool 88 having a coil spring 90 (as best illustrated in FIG. 10) or other conventional biasing device for reversing rotation of the spool 88 and retracting the leash 74" back into the housing 86 once withdrawn and the tension on the leash 74" is relaxed. In the illustrated embodiment, the biasing device is a coil spring 96 secured at a first end to a spool axle 92 and at a second end to a mounting device 94 secured to the housing 86. The spool 88 is fixedly mounted to the spool axle 92 which is pivotally mounted within the housing 86. Also fixed to the spool axle 92 is a cam 96 such that as the leash 74" is withdrawn and the spool 88 rotated, the cam 96 is likewise rotated. The cam 96 of the illustrated embodiment defines a square cross-section in a plane parallel to the spool 88. As illustrated, the cam 96 may define extensions 98 on each side to enhance the performance of the device 10". Namely, as will be understood more clearly below, the extensions 98 create a greater striking force against the piezoelectric crystal 50', thereby increasing the electrical pulse level. It will also be understood by those skilled in the art that the cam 96 may define many other configurations in order to accomplish the objects of the present invention.

In order to generate the electrical pulse, as best illustrated in FIGS. 9A and 9B, a lever 100 defining a first arm 102 and a second arm 104 is pivotally mounted to the housing 86 via a lever arm axle 106. The lever 100 is disposed within the housing 86 such that the cam 96 engages the lever first arm 102 throughout a portion of the rotation of the cam 96 (FIG. 9A) and then releases the lever 100 (FIG. 9B) after the first lever arm 102 passes the extent of a cam extension 98. The second lever arm 104 carries the hammer 56' for striking the first electrical contact 52'. The first and second electrical contacts 52',54' and the piezoelectric crystal 50' are fixed relative to each other and are mounted on the housing 86 in a position such that when the first lever arm 102 becomes disengaged from the cam 96 and the lever 100 is returned to its original disposition, the hammer 56' carried by the second lever arm 104 strikes the first electrical contact 52', thus generating the electrical pulse. As the leash 74" is continued to be withdrawn, the cam 96 continues rotating, the lever 100 is repetitively cocked and released, and ultimately, the charge continues to be generated and delivered to the pet as a series of pulses. In the illustrated embodiment, the electrical pulse is generated four times for every revolution of the cam 96.

In order to accomplish the driving of the hammer 56' toward the first electrical contact 52', an energy storage spring 66' is disposed about the lever axle 106, is fixed at one end to the housing 86, and is engaged at an opposing end to the second lever arm 104 such that when the lever 100 is cocked by engagement with the cam 96, energy is stored therein and then released when the lever 100 becomes disengaged from the cam 96. The energy stored in the energy storage spring 66' is thus utilized to propel the hammer 56' toward the first electrical contact 52' until striking the same.

In order to transfer the shock through the device 10" to the animal, the hammer 56', lever 100, lever axle 106, cam 96 and spool axle 92 are each fabricated from electrically conductive materials and cooperate with the first electrical contact 52' and a first jumper 108 connected between the spool axle 92 and the leash 74" to define a first electrical lead 46". The electrical charge is delivered through the first lever arm 102 to the cam 96 either through direct contact or through an electrical arc between the two, due to their proximity. A second electrical lead 48" is defined by a circular contact 112 disposed on the outer surface of the spool 88, a brush 114 in electrical communication with the second electrical contact 54' and disposed to contact the circular contact 112, and a second jumper 110 connected between the circular contact 112 and the leash 74".

In the illustrated embodiment, a manual release arm 116 is provided and performs at least two functions. First, the manual release arm 116 is manipulated to disengage the first lever arm 102 from the cam 96 in order to permit the biasing device 90 to retract the leash 74" into the housing 86 and allow further generation of electrical pulses. Secondly, the manual release arm 116 may be manipulated to manually cock the lever 100 and then may be quickly released to generate a single electrical charge. This second function may be useful to a trainer, for example, while training a dog as to what is and is not acceptable behavior. In either instance, the housing 86 defines an arcuate opening 118 positioned to allow the manual release arm 116 to travel unencumbered therein. While the illustrated construction of the present invention requires the operation of the manual release arm 116 to recoil the leash 74" within the housing 86, it will be understood by those skilled in the art that a retraction mechanism for automatically retracting the leash 74" into the housing 86 may be incorporated as well.

From the foregoing description, it will be recognized by those skilled in the art that a piezoelectric shocking device offering advantages over the prior art has been provided. Specifically, the device of the present invention provides a behavior modification or prevention device which operates to apply a shock to an animal upon exhibition of an undesired behavior. A force, such as pulling on a leash, pushing a button, or the like is exerted to actuate the device, that force being transformed into an electrical shock applied to an animal to alter or prevent specific behaviors. Because the electrical shock is generated from a force applied to the device, there is no requirement for stored electrical energy such as with conventional battery-operated devices. Although several uses of the present invention are disclosed herein, it will be understood by those skilled in the art that other similar applications are foreseen. Other applications of the present invention may be developed whereby a force exerted by an animal, or by a trainer of the animal, is converted to electrical energy applied to the animal.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. A piezoelectric shocking device for use in training animals to induce a particular behavior, said piezoelectric shocking device comprising:

force exerted on said first electrical contact is transferred directly to said crystal;
   a hammer for striking said first electrical contact with a force required to generate said electrical pulse;
   a return spring is provided for returning said hammer to an initial position away from said first electrical contact, said hammer defining a first extended portion configured to be received within said return spring; and
   an energy storage spring for storing potential energy which is released to propel said hammer toward said first electrical contact, said hammer further defining a second extended portion configured to be received within said energy storage spring.

2. The piezoelectric shocking device of claim 1 further comprising a crystal receptacle carried within said inner housing for securement of said crystal and said first and second electrical contacts, said crystal receptacle defining a shoulder on which a collar defined by said hammer rests prior to activation of the device.

3. The piezoelectric shocking device of claim 2 wherein said hammer collar defines a distal surface sloped away from said second extended portion in order to assist in disengaging said hammer from said shoulder.

4. The piezoelectric shocking device of claim 1 further comprising:

a first coiled lead electrically contacting said energy storage spring and said outer housing securement device, each of said first securement device, said energy storage spring, said hammer and said return spring being fabricated from electrically conductive materials such that said first electrical contact, said return spring, said hammer, said energy storage spring, said first coiled lead, and said first securement device cooperate to define a first electrical lead from a proximal end of said crystal; and
   a second coiled lead electrically contacting said second electrical contact and said second securement device, said second securement device being fabricated from an electrically conductive material such that said second electrical contact, said second coiled lead, and said second securement device cooperate to define a second electrical lead from said distal end of said crystal.

5. The piezoelectric shocking device of claim 1 being adapted to be disposed on a leash, wherein said first securement device and said second securement device are secured along a length of the leash such that a tugging force applied to the leash pulls said inner housing and said outer housing away from one another such as to actuate said electrical pulse generator, said first and second electrical leads terminating in a collar carried by the leash such that said electrical pulse is transmitted to the neck of a pet.

6. The piezoelectric shocking device of claim 1 further comprising a collar configured to be worn about the throat of a horse, wherein said first securement device and said second securement device are secured along a length of said collar such that a tugging force applied to said collar pulls said inner housing and said outer housing away from one another such as to actuate said electrical pulse generator, said first and second electrical leads terminating in said collar such that said electrical pulse is transmitted to the throat of the horse.

7. The piezoelectric shocking device of claim 1 further comprising a fence wire, wherein first securement device and said second securement device are secured along a length of said fence wire such that a tugging force applied to said fence wire pulls said inner housing and said outer housing away from one another such as to actuate said electrical pulse generator, said first electrical lead being electrically connected to a ground and said second electrical lead terminating on said fence wire such that said electrical pulse is transmitted through said fence wire.

8. A piezoelectric shocking device for use in training animals to induce a particular behavior, said piezoelectric shocking device comprising:

an inner housing defining a cylindrical side wall having an opening at a proximal end and a distal end thereof, a proximal end wall configured to substantially cover said proximal end opening, and a distal end wall configured to substantially cover said distal end opening;
   an outer housing for receiving said inner housing, said outer housing defining a cylindrical side wall having an opening at a proximal end and a distal end thereof, and an end wall configured to at least partially cover said proximal end opening, said cylindrical wall being configured to closely and slidably receive said inner housing through said outer housing distal end opening;
   an electrical pulse generator disposed within said inner housing, said electrical pulse generator including at least a piezoelectric ceramic crystal for generating an electrical pulse from a force exerted thereon, said electrical pulse generator including:
   first and second electrical contacts positioned on either end of said piezoelectric ceramic crystal and in direct contact therewith such that a force exerted on said first electrical contact is transferred directly to said crystal;
   a hammer for striking said first electrical contact with a force required to generate said electrical pulse,
   a return spring is provided for returning said hammer to an initial position away from said first electrical contact, said hammer defining a first extended portion configured to be received within said return spring; and
   an energy storage spring for storing potential energy which is released to propel said hammer toward said first electrical contact, said hammer further defining a second extended portion configured to be received within said energy storage spring;
   a first securement device carried by said outer housing proximal end wall, said first securement device being fabricated from an electrically conductive material;
   a second securement device carried by said inner housing distal end wall, said first and second securement devices cooperating to provide a mechanism for pulling said inner and outer housing away from one another in a sliding fashion said second securement device being fabricated from an electrically conductive material;

a first coiled lead electrically contacting said energy storage spring and said outer housing securement device, each of said first securement device, said energy storage spring, said hammer and said return spring being fabricated from electrically conductive materials such that said first electrical contact, said return spring, said hammer, said energy storage spring, said first coiled lead, and said first securement device cooperate to define a first electrical lead from a proximal end of said crystal; and a second coiled lead electrically contacting said second electrical contact and said second securement device, said second securement device being fabricated from an electrically conductive material such that said second electrical contact, said second coiled lead, and said second securement device cooperate to define a second electrical lead from said distal end of said crystal.

9. The piezoelectric shocking device of claim 8 further comprising a crystal receptacle carried within said inner housing for securement of said crystal and said first and second electrical contacts, said crystal receptacle defining a shoulder on which a collar defined by said hammer rests prior to activation of the device.

10. The piezoelectric shocking device of claim 9 wherein said hammer collar defines a distal surface sloped away from said second extended portion in order to assist in disengaging said hammer from said shoulder.

11. The piezoelectric shocking device of claim 8 further comprising a limiter including a pin carried by and fixed to said outer housing cylindrical wall and received through a pair of slotted openings defined by said inner housing cylindrical wall, said slotted openings being configured to prevent rotation of said inner housing within said outer housing and to limit travel of said inner housing within said outer housing.

12. The piezoelectric shocking device of claim 8 being adapted to be disposed on a leash, wherein said first securement device and said second securement device are secured along a length of the leash such that a tugging force applied to the leash pulls said inner housing and said outer housing away from one another such as to actuate said electrical pulse generator, said first and second electrical leads terminating in a collar carried by the leash such that said electrical pulse is transmitted to the neck of a pet.

13. The piezoelectric shocking device of claim 8 being adapted to be disposed on a leash including a collar configured to be worn by a pet, said inner housing and said outer housing being disposed at a handle portion of the leash, said piezoelectric shocking device further comprising:

an actuator carried by said inner housing for actuating said electrical pulse generator by a trainer handling the pet; and first and second electrical contacts positioned on either end of said piezoelectric ceramic crystal and in direct contact therewith such that a force exerted on said first electrical contact is transferred directly to said crystal, said first and second electrical leads terminating proximate said collar such that said electrical pulse is transmitted to the neck of the pet.

14. The piezoelectric shocking device of claim 8 further comprising a collar configured to be worn about the throat of a horse, wherein said first securement device and said second securement device are secured along a length of said collar such that a tugging force applied to said collar pulls said inner housing and said outer housing away from one another such as to actuate said electrical pulse generator, said first and second electrical leads terminating in said collar such that said electrical pulse is transmitted to the throat of the horse.

15. The piezoelectric shocking device of claim 8 further comprising a fence wire, wherein first securement device and said second securement device are secured along a length of said fence wire such that a tugging force applied to said fence wire pulls said inner housing and said outer housing away from one another such as to actuate said electrical pulse generator, said first electrical lead being electrically connected to a ground and said second electrical lead terminating on said fence wire such that said electrical pulse is transmitted through said fence wire.

16. A piezoelectric shocking device for use in training animals to induce a particular behavior, said piezoelectric shocking device being adapted to be disposed on a leash including a collar configured to be worn by a pet, said piezoelectric shocking device comprising:

a housing disposed at a handle portion of said leash, said leash;

an electrical pulse generator disposed within said housing, said electrical pulse generator including at least a piezoelectric ceramic crystal for generating an electrical pulse from a force exerted thereon;

an actuator carried by said housing for actuating said electrical pulse generator by a trainer handling the pet; and first and second electrical contacts positioned on either end of said piezoelectric ceramic crystal and in direct contact therewith such that a force exerted on said first electrical contact is transferred directly to said crystal, said electrical pulse being transmitted through first and second electrical leads terminating proximate said collar such that said electrical pulse is transmitted to the neck of the pet.

17. A piezoelectric shocking device for use in training animals to induce a particular behavior, said piezoelectric shocking device comprising:

a housing including:
an inner housing defining a cylindrical side wall having an opening at a proximal end and a distal end thereof, a proximal end wall configured to substantially cover said proximal end opening, and a distal end wall configured to substantially cover said distal end opening;

an outer housing for receiving said inner housing, said outer housing defining a cylindrical side wall having an opening at a proximal end and a distal end thereof, and an end wall configured to at least partially cover said outer housing proximal end opening, said outer housing cylindrical side wall being configured to closely and slidably receive said inner housing through said outer housing distal end opening;

a limiter including a pin carried by and fixed to said outer housing cylindrical side wall and received through a pair of slotted openings defined by said inner housing cylindrical side wall, said slotted openings being configured to prevent rotation of said inner housing within said outer housing and to limit travel of said inner housing within said outer housing;

a first securement device carried by said outer housing proximal end wall; and a second securement device carried by said inner housing distal end wall, said first and second securement devices cooperating to provide a mechanism for pulling said inner and outer housing away from one another in a sliding fashion; and an electrical pulse generator disposed within said housing, said electrical pulse generator including at least a piezoelectric ceramic crystal for generating an electrical pulse from a force exerted thereon.

* * * * *

UNITED STATES PATENT AND TRADEMARK OFFICE
CERTIFICATE OF CORRECTION

PATENT NO. : 6,116,192
DATED : September 12, 2000
INVENTOR(S) : J. Dustin Hultine et al.

It is certified that error appears in the above-identified patent and that said Letters Patent is hereby corrected as shown below:

Change Claim 1 to read:

1. A piezoelectric shocking device for use in training animals to induce a particular behavior, said piezoelectric shocking device comprising:
a housing including:
an inner housing defining a cylindrical side wall having an opening at a proximal end and a distal end thereof, a proximal end wall configured to substantially cover said proximal end opening, and a distal end wall configured to substantially cover said distal end opening;
an outer housing for receiving said inner housing, said outer housing defining a cylindrical side wall having an opening at a proximal end and a distal end thereof, and an end wall configured to at least partially cover said outer housing proximal end opening, said outer housing cylindrical side wall being configured to closely and slidably receive said inner housing through said outer housing distal end opening;
a first securement device carried by said outer housing proximal end wall; and,
a second securement device carried by said inner housing distal end wall, said first and second securement devices cooperating to provide a mechanism for pulling said inner and outer housing away from one another in a sliding fashion; and

UNITED STATES PATENT AND TRADEMARK OFFICE
CERTIFICATE OF CORRECTION

PATENT NO. : 6,116,192
DATED : September 12, 2000
INVENTOR(S) : J. Dustin Hultine et al.

It is certified that error appears in the above-identified patent and that said Letters Patent is hereby corrected as shown below:

an electrical pulse generator disposed within said housing, said electrical pulse generator including at least:
  a piezoelectric ceramic crystal for generating an electrical pulse from a force exerted thereon;
  first and second electrical contacts positioned on either end of said piezoelectric ceramic crystal and in direct contact therewith such that a force exerted on said first electrical contact is transferred directly to said crystal;
  a hammer for striking said first electrical contact with a force required to generate said electrical pulse;
  a return spring is provided for returning said hammer to an initial position away from said first electrical contact, said hammer defining a first extended portion configured to be received within said return spring; and
  an energy storage spring for storing potential energy which is released to propel said hammer toward said first electrical contact, said hammer further defining a second extended portion configured to be received within said, energy storage spring.

Signed and Sealed this

Eighteenth Day of December, 2001

*Attest:*

JAMES E. ROGAN
*Attesting Officer*    Director of the United States Patent and Trademark Office